United States Patent
Tammar et al.

(10) Patent No.: US 8,465,784 B2
(45) Date of Patent: Jun. 18, 2013

(54) METHOD FOR THE MICROWAVE THAWING OF FOOD PRODUCTS

(75) Inventors: Moez Tammar, Antony (FR); Pierre Kowalewski, Paris (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 169 days.

(21) Appl. No.: 12/921,900

(22) PCT Filed: Mar. 3, 2009

(86) PCT No.: PCT/FR2009/050342
§ 371 (c)(1),
(2), (4) Date: Sep. 10, 2010

(87) PCT Pub. No.: WO2009/115723
PCT Pub. Date: Sep. 24, 2009

(65) Prior Publication Data
US 2011/0014332 A1    Jan. 20, 2011

(30) Foreign Application Priority Data
Mar. 10, 2008   (FR) ..................................... 08 51514

(51) Int. Cl.
*A23B 4/07*    (2006.01)
(52) U.S. Cl.
USPC ........... 426/235; 426/236; 426/241; 426/294; 426/296; 426/524
(58) Field of Classification Search
USPC ................. 426/235, 236, 241–243, 524, 641, 426/643–646, 289, 294, 296
See application file for complete search history.

(56) References Cited

U.S. PATENT DOCUMENTS

| | | | |
|---|---|---|---|
| 1,546,682 A | 7/1925 | Slate | |
| 2,768,896 A * | 10/1956 | Lewis | 426/307 |
| 3,536,129 A * | 10/1970 | White | 165/61 |
| 4,325,720 A | 4/1982 | Students | |
| 4,343,979 A * | 8/1982 | Barbini et al. | 219/700 |
| 4,390,356 A | 6/1983 | Preiss et al. | |
| 5,087,464 A * | 2/1992 | Eberhardt et al. | 426/231 |
| 5,765,394 A * | 6/1998 | Rhoades | 62/603 |
| 2006/0292271 A1* | 12/2006 | King | 426/235 |
| 2012/0196006 A1* | 8/2012 | Jones | 426/96 |

FOREIGN PATENT DOCUMENTS

| | | |
|---|---|---|
| FR | 2 405 023 | 5/1979 |
| FR | 2480085 A * | 10/1981 |
| GB | 1 534 845 | 12/1978 |
| GB | 2 412 563 | 10/2005 |
| WO | WO 2004/054324 | 6/2004 |
| WO | WO 2007/039284 | 4/2007 |

OTHER PUBLICATIONS

International Search Report for PCT/FR2009/050342, mailed Nov. 11, 2009.

* cited by examiner

*Primary Examiner* — Drew E Becker
(74) *Attorney, Agent, or Firm* — Christopher J. Cronin

(57) ABSTRACT

The invention related to a method and a device for thawing food products that comprises using at least one microwave radiation applicator in a chamber through which said products are passing, characterized in that before the insertion into the chamber or a first inlet area of the chamber, all the surfaces of the product are covered with a homogenous film of carbon dioxide snow in the form of electrostatically charged microparticles.

5 Claims, 2 Drawing Sheets

METHOD FOR THE MICROWAVE THAWING OF FOOD PRODUCTS

CROSS-REFERENCE TO RELATED APPLICATIONS

This application is a §371 of International PCT Application PCT/FR2009/050342, filed Mar. 3, 2009, which claims §119(a) foreign priority to French application 0851514, filed Mar. 10, 2008.

BACKGROUND

1. Field of Invention

The present invention relates to the field of the thawing of food products using microwave technology. It is more especially concerned with the methods of thawing that allow foodstuffs in the form of large pieces or blocks, for examples blocks of fish or meat weighing in excess of 20 or even 30 kilograms, to be thawed.

One of the objectives of the present invention is to allow good control over the temperature ensuring even core and surface temperatures avoiding hot spots.

2. Related Art

Specifically, documents proposing pre-cooling of the surface of the product before microwave energy is applied (in order to avoid the phenomena of cooking) are many in number (reference may be made to documents WO2007/039284, GB-1 534 845 or, alternatively, FR-2 405 023), but it is nonetheless found that, in practice, in this industry, real technical difficulties are encountered, which difficulties can be summed up as follows: temperatures that are not even after thawing are found, particularly, it is impossible to achieve a core reference temperature (for example a core temperature of −2° C.) without creating hot spots on the surface of the item, and therefore modifying the quality, structure and appearance of the product.

Because of this, many user sites prefer to leave their blocks (of fish, or even of meat) to thaw naturally in a cold room for 24 to 48 h, which, it will be appreciated, severely penalizes the overall production line, and, incidentally, is not the optimum solution from a food hygiene standpoint either.

SUMMARY OF THE INVENTION

As will be seen in greater detail in what follows, the present invention relates to a novel method of thawing food products using microwave technology, the characteristics of which can be summarized as follows: the product is brought into contact with $CO_2$ in the form of snow of very small particles (typically the size of washing powder), these particles being charged with static electricity.

The size of such particles is typically of the order of a few hundred microns, for example around 500 microns.

In fact, contrary to the approach adopted by the prior art which concentrates on cooling the product prior to the microwave treatment (i.e. on keeping some of the water of the product frozen, on the surface of the product, so as to reduce the effect of the waves and dissipate the temperature rise), the present invention concentrates on covering the surface of the product with a film of carbon dioxide snow in the form of such electrostatically charged microparticles and it has been found in practice that such conditions make it possible to achieve excellent coverage, not only of the blocks, but also of their edge corners, something that the methods of the prior art never managed to achieve, and this is of fundamental importance to avoid surface dissipation of microwave energy and also to eliminate hot spots. It is thus especially advantageous to apply an even film of carbon dioxide snow which covers the entire exterior surface of the product.

The use of cyclone-type systems for producing the carbon dioxide snow is therefore encouraged according to the invention, as such systems make this coverage easier.

Traditional discharge-horn systems can be found in documents FR-2808585 and FR-2762190. In such systems, a feeder is typically supplied with liquid $CO_2$ and it in turn supplies a series of discharge horns fitted with electrically operated valves or calibrated orifices.

Typically, 1 kg of liquid $CO_2$ (at −20° C., 20 bar) will yield 47% snow and 53% gas, and a diphasic form will thus be produced in the form of a mass of snow.

It will therefore be appreciated that, using this method, it is difficult to obtain uniform coverage of the surface of the product.

Let us now recall hereinbelow how cyclones work.

Cyclones are an old technology dating back several tens of years, the underlying principle of which is well known (see in particular, documents U.S. Pat. No. 4,390,356, U.S. Pat. No. 4,325,720 or, alternatively, U.S. Pat. No. 1,546,682), which employs the production and separation of snow and $CO_2$ in gas form in a cone structure, through the combined effect of centrifugal forces and the force of gravity. This cone is traditionally made of polymer (polyethylene, or alternatively polypropylene), the properties of which are such that the cone remains both rigid and flexible at these temperatures, and able to withstand the impact of the $CO_2$ particles but nonetheless avoids phenomena of sticking.

The novelty here is the production of snow in the form of microbeads, with a particle size typically equal to that of washing powder and which, upon contact with the internal surface of the cyclone (which is very smooth and made of plastic) become charged with static electricity. It can therefore be thought that on leaving the cyclone, the snow, because of this static electricity, will be able to form a very even film which will uniformly cover the surface of the product.

The present invention therefore relates to a method for thawing food products, of the type employing the action, in a chamber through which the products pass, of at least one applicator of microwave radiation, characterized in that, before the product enters the chamber or, alternatively, in a first entrance zone of the chamber, all the surfaces thereof are covered with an even film of carbon dioxide snow in the form of electrostatically charged microparticles.

By way of a device for producing and applying the $CO_2$, use will preferably be made of one or more cyclone-type (centrifuging) devices fitted with a convergent cone made of polymer.

Specifically, use may be made of several cyclone-type (or other) devices in order to cover all the faces of the product and its underside by depositing a film of snow on the conveyor before the product is set down, but it is also possible, according to the invention and very advantageously, to use a single cyclone-type device positioned upstream of the opening of the chamber or alternatively in the chamber itself, in the entrance zone thereof above the conveyor, sequencing as follows (step by step system; one step back, two steps forward):

depositing a film (it could also be called a blob) of snow (i+1) on the conveyor;

subjecting the conveyor to one step backward in order to bring this film to face a product depositing system and depositing a product (i+1) on the film of snow (i+1) previously deposited;

moving two steps forward, depositing a new film of snow (i) on the conveyor upstream of the previous product (i+1);

moving one step backward in order to place the product (i+1) opposite the cyclone-type device and deposit snow on the product (i+1), and depositing a product (i) on the film (i);

moving two steps forward, and depositing a film of snow (i−1) on the conveyor upstream of the film (i);

subjecting the conveyor to one step backward, in order to deposit a product (i−1) on the film (i−1) and deposit snow on the product (i).

and so on.

Hence, in total, it will have been appreciated that the products progress through the tunnel because they follow an overall sequence of "one step back, two steps forward", which allows them to progress through the tunnel at the desired pace (typically, for a tunnel 6 m long, the blocks processed, when large in size, need to be resident in the tunnel for 10 to 15 minutes).

While, as will have been appreciated from reading the foregoing, it is preferable according to the invention to use one or more cyclone-type devices, it is also conceivable to use other devices for depositing such a layer of $CO_2$, for example a system for driving and spreading snow using a screw system.

The method according to the invention may adopt one or more of the following features:

in order to cover the surfaces of the product with an even film of carbon dioxide snow, use is made of one or more cyclone-type devices for producing carbon dioxide snow and applying it to the product, this device (these devices) being equipped with a convergent cone made of polymer;

in order to cover the surfaces of the product with an even film of carbon dioxide snow, use is made of a single cyclone-type device positioned upstream of the opening of the chamber or alternatively in the chamber itself, in the entrance zone thereof above the conveyor, sequencing the progress of the products as follows:

depositing a film of snow (i+1) on the conveyor;

subjecting the conveyor to one step backward in order to bring this film (i+1) to face a product depositing system and depositing a product (i+1) on the film of snow (i+1) previously deposited;

subjecting the conveyor to two steps forward, depositing a new film of snow (i) on the conveyor upstream of the previous product (i+1);

subjecting the conveyor to one step backward in order to place the product (i+1) opposite the cyclone-type device and deposit snow on the product (i+1), and depositing a product (i) on the film (i);

subjecting the conveyor to two steps forward, and depositing a film of snow (i−1) on the conveyor upstream of the film (i);

subjecting the conveyor to one step backward, in order to deposit a product (i−1) on the film (i−1) and deposit snow on the product (i), and so on.

said sequence makes it possible to obtain a product residence time of 10 to 15 minutes inside the chamber;

in order to cover the surfaces of the product with an even film of carbon dioxide snow, use is made of two cyclone-type devices, the first being positioned upstream of the entrance to the chamber and of the product loading zone, the second being positioned inside the chamber in its entrance zone, the products moving continuously forward through the system.

The invention also relates to a device for thawing food products of the type comprising, in a chamber through which the products pass, at least one applicator of microwave radiation, characterized in that, upstream of the entrance to the chamber or, alternatively, inside the chamber in its entrance zone, there are one or more device(s) for producing an even film of carbon dioxide snow and applying it to the surfaces of the product, the carbon dioxide snow being in the form of electrostatically charged microparticles.

The device according to the invention may adopt one or more of the following features:

by way of device(s) for producing and applying the $CO_2$, use is made of one or more cyclone-type devices equipped with a convergent cone made of polymer;

it comprises a single, cyclone-type device for producing and applying the $CO_2$, positioned upstream of the opening of the chamber or, alternatively, in the chamber itself in its entrance zone above the conveyor, and it comprises a system for controlling the movement of the conveyor that causes the products to pass through the chamber, the control system being able to implement the following sequence:

depositing a film of snow (i+1) on the conveyor;

moving the conveyor one step backward in order to bring this film (i+1) to face a product depositing system so that a product (i+1) can be deposited on the film of snow (i+1) previously deposited;

moving the conveyor two steps forward so that a new film of snow (1) can be deposited on the conveyor upstream of the previous product (i+1);

moving the conveyor one step backward so that the product (i+1) can be placed opposite the cyclone-type device and snow can be deposited on the product (i+1), and so that a product (i) can be deposited on the film (i);

moving the conveyor two steps forward so that a film of snow (i−1) can be deposited on the conveyor upstream of the film (i);

moving the conveyor one step backward so that a product (i−1) can be deposited on the film (i−1) and so that snow can be deposited on the product (i), and so on.

BRIEF DESCRIPTION OF THE FIGURES

Other features and advantages will become apparent from the following description of some embodiments of the invention, which is given notably with reference to the attached figures.

DETAILED DESCRIPTION OF THE INVENTION

In the foregoing and in that which follows, mention is made of the presence of a device for depositing products, but it will be appreciated that at certain industrial sites, this depositing may just as easily be performed by hand, by an operator.

Figure 1:
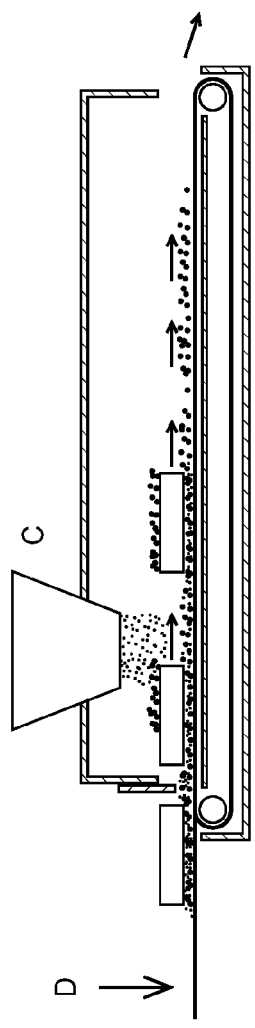
FIG. 1 schematically depicts a device for implementing the invention, comprising a single cyclone-type device positioned in the chamber itself in the entrance zone thereof above the conveyor.

FIG. 1 shows a tunnel for the continuous thawing of food products, comprising at least one applicator of microwave radiation (not depicted in the figure in order not to overload this figure, but well known to those skilled in the art), the installation being equipped, upstream of the entrance to the tunnel, with a device (D) for depositing products, and with a cyclone-type device (C) for producing a film of carbon dioxide snow and applying it to the surface of the product situated inside the tunnel in the entrance zone thereof.

Figure 2:
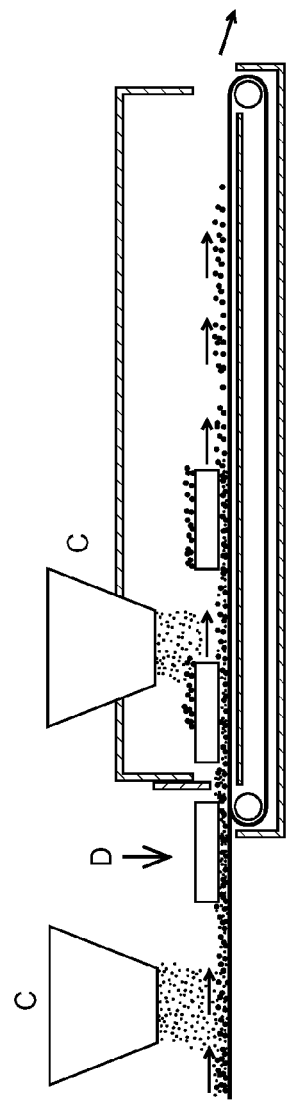
FIG. 2 schematically depicts a device for implementing the invention, comprising two cyclone-type devices, the first positioned upstream of the chamber and of the product loading zone, to cover the conveyor uniformly with a film of snow, the second cyclone-type device being positioned in the entrance zone of the chamber, just after the product entrance.

FIG. 2 illustrates another embodiment of the invention employing two cyclone-type devices, the first positioned upstream of the chamber and of the product loading zone (D), to cover the conveyor uniformly with a film of snow, the second cyclone-type device being positioned inside the chamber, in the entrance zone thereof, just after the product entrance.

For this embodiment of FIG. 2, the conveyor can move continuously forward, the thickness of the film being regulated by the speed of the conveyor and the amount of snow injected.

Figure 3:
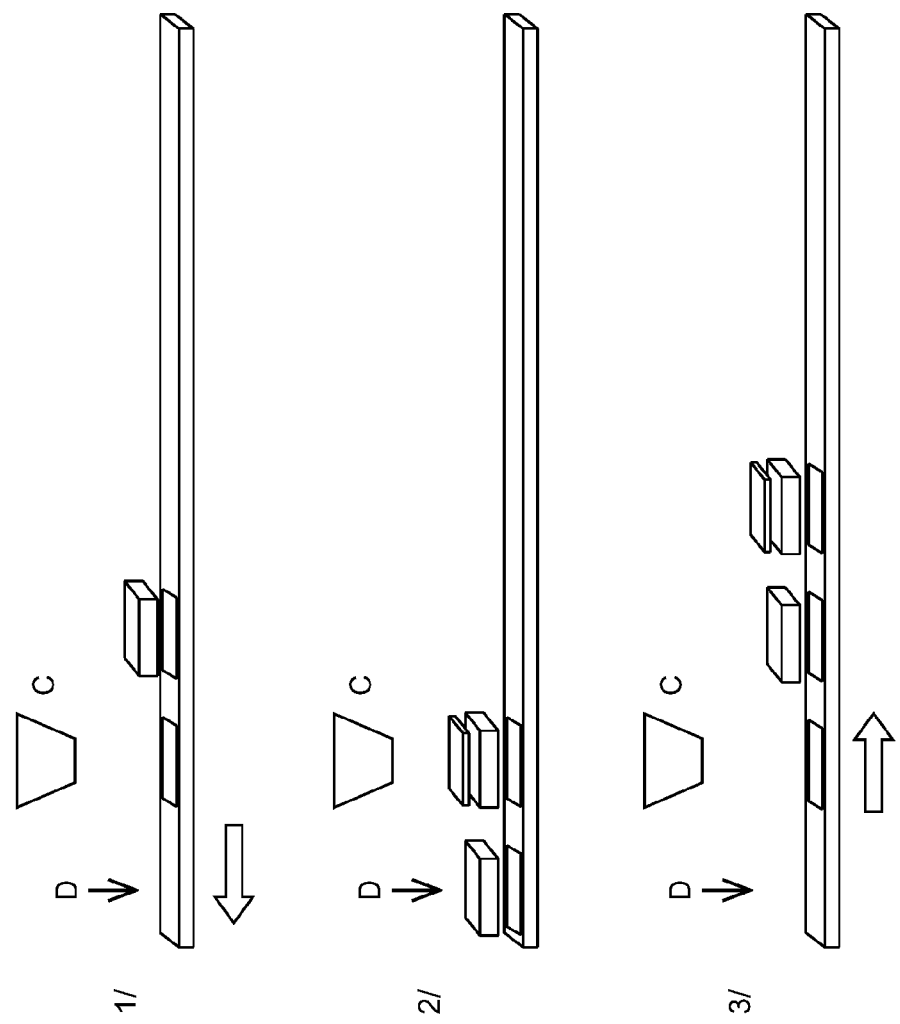
FIG. 3 schematically illustrates the sequence in which the conveyor according to the invention advances using a single cyclone-type device.

FIG. 3 for its part provides a better picture of one way of sequencing the treatment of the products according to the invention, using just one cyclone-type device for producing $CO_2$ particles (whether this device is situated upstream of the entrance or inside the tunnel), and the following operations can thus be seen very clearly in the three steps 1/ 2/ and 3/ of this figure:

Step 1/ in the figure: a film/blob of snow (i+1) has been deposited on the conveyor, the conveyor has been moved backward by one step to bring this film (i+1) to face a system (D) for depositing the products (whether automatically or by hand) and a product (i+1) has been deposited on the film of snow (i+1) previously deposited; the conveyor has been moved two steps forward and another film/blob of snow (i) has been deposited on the conveyor upstream of the previous product (i+1);

Step 2/ in the figure: the conveyor has been moved backward by one step to bring the product (i+1) to face the cyclone-type device (C) and to deposit snow on the product (i+1) and, in this same position, a product (i) has been deposited on the film (i);

Step 3/ in the figure: the conveyor has been moved two steps forward to deposit a film of snow (i−1) on the conveyor upstream of the film and product (i).

Further, although the subsequent steps are not shown in this figure, it will be clearly understood that the conveyor is then moved backward by one step to deposit a product (i+1) on the film (i+1) deposited during step 3/ and to deposit snow on the product (i), and so on.

The results of some implementation examples are now reported hereinbelow.

Product tested: blocks of fish fillet (initial temperature −18° C., dimensions 255×485×60 mm).

$CO_2$: for a first, comparative, test we used $CO_2$ mini sticks of a diameter of around 2 mm.

Dry ice and microwaves: to evaluate how the dry ice ($CO_2$) behaves in the presence of microwaves, we introduced 500 g of dry ice into a microwave cell for 15 minutes and compared the loss of weight as against 500 g of dry ice outside the cell. The result showed that the microwave oven did not heat the dry ice. Its weight did not change.

1st approach: test performed in an insulated body leaving the product uniformly in contact with the mini sticks for two different lengths of time, until a crust temperature and a temperature a few cm below the surface of −40° C. and of −60° C. respectively were reached (with a surface temperature of −80° C.). The result after microwave thawing shows that with such a procedure, the temperature difference between the core and the surface has indeed been reduced, but the phenomenon of the creation of hot spots has not been eliminated.

2nd approach: we surrounded the blocks of frozen fish with the 2 mm mini sticks and immediately introduced the whole into a microwave tunnel. The result obtained shows core and surface temperatures that are even and the reference temperature of −2° C. in the core was achieved without heating the exterior surface of the product, although nonetheless the phenomenon of the creation of hot spots was not eliminated here either.

The results of tests carried out in accordance with the invention, using a single cyclone-type device situated upstream of the entrance to the tunnel are presented hereinbelow:

1/ Product: blocks of fish pulp
2/ Dimensions: 480×250×60
3/ Weight: 7.5 kg
4/ Product temperatures:
  Initial temperature: −18° C.
  Final core temperature: −1° C./0° C.
  Final surface temperature: 0° C.
5/ Power (microwave power): 7 kW (2.45 GHz)
6/ Treatment time: around 9 min
7/ Amount of carbon dioxide snow (consumed): 600 g per block The results obtained under such conditions according to the invention are, on the one hand, that the temperature remains even between the core and the surface and, on the other hand, that the formation of hot spots on the surface of the product is avoided.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for thawing food products employing the action, in a chamber through which the products pass, of at least one applicator of microwave radiation, wherein before the product enters the chamber or a first entrance zone of the chamber, all surfaces of the product are covered with an even film of carbon dioxide snow in the form of electrostatically charged microparticles.

2. The thawing method of claim 1, wherein, in order to cover the surfaces of the product with an even film of carbon dioxide snow, use is made of one or more cyclone-type devices for producing carbon dioxide snow and applying it to the product, the one or more devices being equipped with a convergent cone made of polymer.

3. The thawing method of claim 1, wherein, in order to cover the surfaces of the product with an even film of carbon dioxide snow, use is made of first and second cyclone-type devices, the first cyclone-type device being positioned upstream of the entrance to the chamber and of the product loading zone, the second cyclone-type device being positioned inside the entrance zone of the chamber, wherein the products move continuously forward through the system.

4. A method for thawing food products employing the action, in a chamber through which the products pass, of at least one applicator of microwave radiation, wherein before the product enters the chamber or a first entrance zone of the chamber, all surfaces of the product are covered with an even film of carbon dioxide snow in the form of electrostatically charged microparticles, wherein:

in order to cover the surfaces of the product with an even film of carbon dioxide snow, use is made of a single cyclone-type device positioned upstream of an opening of the chamber or positioned upstream of the chamber in the entrance zone thereof above a conveyor; and said method follows a sequence comprises the steps of:

depositing a film of snow (i+1) on the conveyor;

bringing the conveyor one step backward in order to bring the desposited film (i+1) to face a product depositing system and depositing a product (i+1) on the film of snow (i+1) previously deposited;

bringing the conveyor two steps forward and depositing a new film of snow (i) on the conveyor upstream of the previous product (i+1);

bringing the conveyor one step backward in order to place the product (i+1) opposite the cyclone-type device and deposit snow on the product (i+1) followed by depositing a product (i) on the film (i);

bringing the conveyor two steps forward and depositing a film of snow (i−1) on the conveyor upstream of the film (i); and bringing the conveyor one step backward in order to deposit a product (i−1) on the film (i−1) followed by depositing snow on the product (i).

5. The thawing method of claim 4, wherein performance of said sequence makes it possible to obtain a product residence time of 10 to 15 minutes inside the chamber.

* * * * *